UNITED STATES PATENT OFFICE.

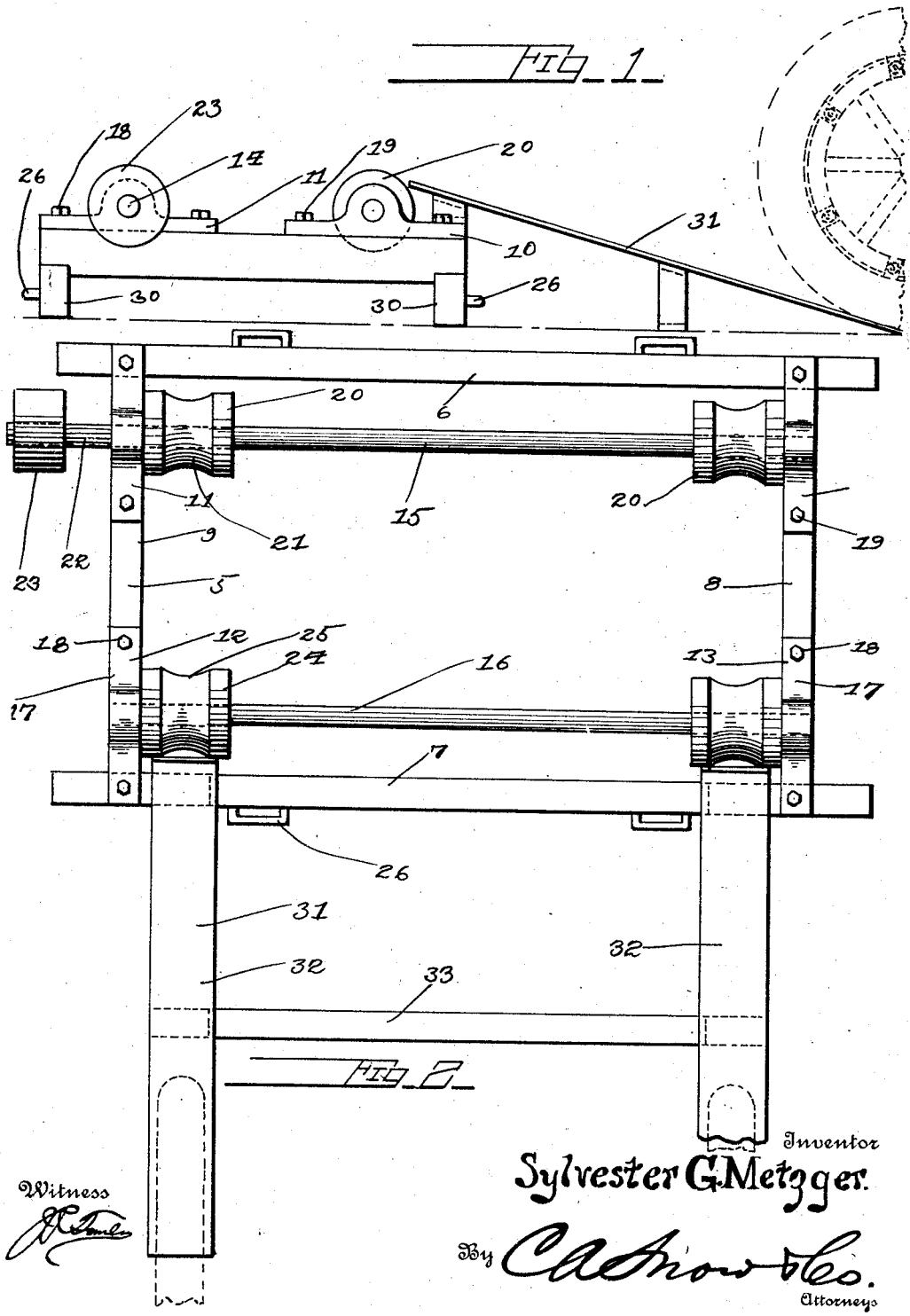

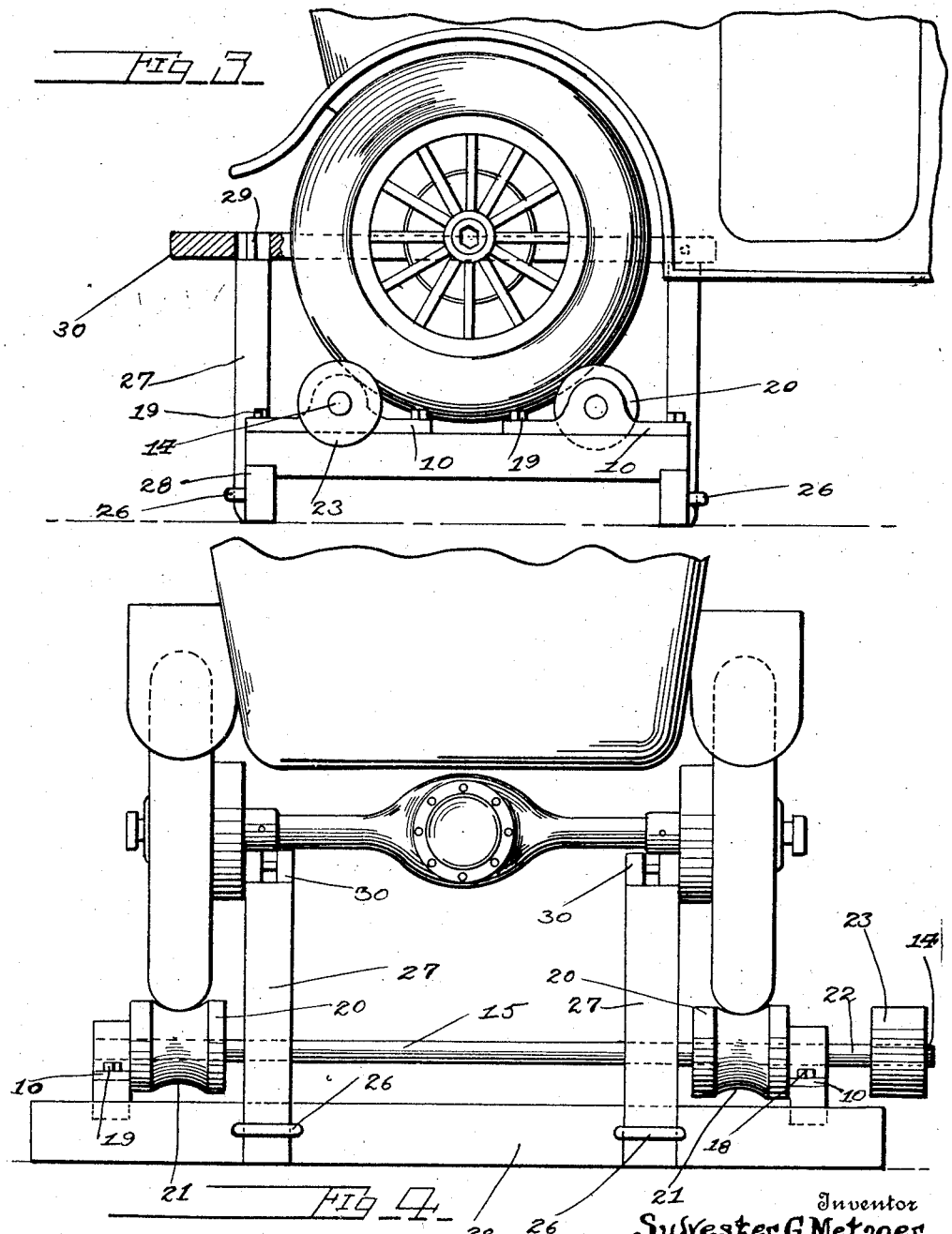

SYLVESTER G. METZGER, OF DELPHOS, OHIO.

POWER DEVICE.

1,340,620.    Specification of Letters Patent.    Patented May 18, 1920.

Application filed October 17, 1919. Serial No. 331,311.

*To all whom it may concern:*

Be it known that I, SYLVESTER G. METZGER, a citizen of the United States, residing at Delphos, in the county of Allen and State of Ohio, have invented a new and useful Power Device, of which the following is a specification.

This invention relates to new and useful improvements in power devices, and more particularly to a transmission device employed for utilizing the propelling means of an automobile, for operating various types of machinery, receiving power through an endless belt.

The principle object of the invention is to provide a transmission device including rollers adapted to support the wheels of an automobile, the rollers having connection with a belt pulley, whereby rotary movement of the wheels of the automobile, causes a relative movement of the rollers, and belt pulley.

A further object of the invention is to provide means having connection with the transmission device for contacting with the rear axle of an automobile for adjusting the wheels thereof with relation to the transmission device, whereby the pressure of the wheels on the rollers of the transmission device, may be regulated to meet various requirements.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a side elevational view of a transmission device, constructed in accordance with the present invention, Fig. 2 illustrates a plan view of the same, Fig. 3 illustrates a side elevational view of the device, disclosing an automobile wheel as positioned thereon, and Fig. 4 is a rear elevational view of the same.

Referring to the drawings in detail, the transmission device includes a frame 5, which frame comprises the front and rear bars 6 and 7, connected adjacent their ends, by the side bars 8 and 9, the side bars 8 and 9, being shown as supporting the bearings 10, 11, 12, and 13, which bearings are provided with openings 14, for the reception of the ends of the shafts 15 and 16 respectively.

These bearings, include laterally extending arms 17, apertured as at 18, to receive the securing bolts 19, passing through the bearings and the side bars 8 and 9, whereby the bearings are secured to the side bars 8 and 9, against displacement.

The shaft 15, has its ends supported in the bearings 10 and 11, and provides a support for the rollers 20, keyed or otherwise secured to the shaft 15, so that rotary movement imparted to the rollers 20, will cause a relative movement of the shaft 15, the surfaces of the rollers 20, being concaved as at 21, to conform to the contour of tires, such as are employed on automobile wheels.

This shaft 15, has one of its ends extending beyond the side bar 9, as at 22, to which shaft, is secured by any suitable means, the pulley 23, which pulley in use, coöperates with a belt, for taking off rotary motion imparted to the shaft 15, by an automobile, as previously described.

The forward shaft 16, has its ends journaled in the bearings 12 and 13 respectively, and this shaft also supports the rollers 24, which have concave surfaces 25 to receive the curved surface of an automobile tire.

As shown, the shafts 15 and 16, are disposed in spaced relation with each other, so that the rollers of the respective shafts will accommodate an automobile wheel, the rollers on the rear shaft contacting with the rear portions of the automobile wheels, while the rollers on the forward shaft contact with the forward portions of the automobile wheel.

It will thus be seen that when rotary movement is imparted to the wheels supported on the rollers 20 and 24, the pulley 23, rotates in a similar manner, with the result that an endless belt, operating on the pulley 23, and which is not shown in the present disclosure, transmits movement to suitable machinery.

Disposed in spaced relation with each other, and secured in the outer surfaces of the front and rear bars, 6 and 7 of the frame, are the bracket members 26, which bracket members embrace the lower portions of the standards 27, as indicated by Figs. 3 and 4 of the drawings, the standards 27 being cut away as at 28, to provide shoulders, for contacting with the upper surfaces of the bars 6 and 7.

Supported within the upper end of each of the standards 27, is a pin 29, which pins contact with suitable cut out portions formed in the horizontal bars 30, whereby the horizontal bars 30 are prevented from lateral movement with relation to the standards 27, supporting the same.

These horizontal bars 30, are constructed to engage the rear axle of an automobile, as indicated by Fig. 4 of the drawings, and are for the purpose of adjusting the pressure of the automobile, on the rollers 20 and 24, it of course being obvious that the pressure between the rollers 20 and 24, and wheels of the automobile may be greatly reduced, when the device is employed for operating light machinery. In the event that the device is employed for transmitting power to heavy machinery, the supporting means, which includes the standards 27, and horizontally disposed bars 30, may be dispensed with.

In order that an automobile may be readily positioned on the transmission device, the run-way 31, is provided, which run-way comprises parallel tracks 32, connected by the bar 33, which bar 33 also contacts with the surface on which the transmission device is supported, for preventing sagging of the track 32, when an automobile is moving thereover.

When the device is put to use, an automobile is moved over the tracks 32, and into engagement with the rollers 24 of the forward shaft 16, further movement of the automobile results in the same dropping down to its proper operating position between the opposed rollers of the parallel shafts 15 and 16.

Having thus described the invention, what is claimed is:—

1. In a transmission device, a main frame, bearings supported by the main frame, shafts operating in the bearings, rollers on the shafts, a supporting frame including standards, each of said standards having a pin extending from the upper end thereof, horizontal bars, said horizontal bars having openings to receive the pins of the standards, whereby the standards and horizontal bars are connected, and a runway having connection with the main frame.

2. In a transmission device, a frame, bearings supported by the frame, shafts operating in the bearings, rollers carried by the shafts, a supporting frame including standards, and horizontal bars, bracket members secured to the first mentioned frame, said bracket members adapted to embrace the lower ends of the standard, for securing the standards to the first mentioned frame, and means for removably securing the horizontal bars to the standards.

In testimony that I claim the foregoing as my own, I have hereto affixed my signature in the presence of two witnesses.

SYLVESTER G. METZGER.

Witnesses:
D. M. BLISS,
HORTENSE BLISS.